United States Patent [19]

Brown, Jr. et al.

[11] 3,766,482

[45] Oct. 16, 1973

[54] RADIANT ENERGY RECEIVERS

[75] Inventors: Houston Alfred Brown, Jr., Granada Hills; Donald H. Keilen, Chatsworth; Saburo Ifune, Granada Hills, all of Calif.

[73] Assignee: International Telephone and Telegraph Corporation, New York, N.Y.

[22] Filed: Mar. 22, 1971

[21] Appl. No.: 126,492

[52] U.S. Cl. .......... 325/419

[51] Int. Cl. .......... H04b 1/16

[58] Field of Search .......... 325/346, 418–422, 325/431–433; 331/22, 30, 25; 328/133

[56] References Cited

UNITED STATES PATENTS

| | | | |
|---|---|---|---|
| 3,600,699 | 9/1971 | Orenberg | 331/22 |
| 3,603,885 | 9/1971 | Bartholomew et al. | 331/22 |

*Primary Examiner*—Robert L. Griffin
*Assistant Examiner*—Barry Leibowitz
*Attorney*—C. Cornell Remsen, Jr., Walter J. Baum, Paul W. Hemminger, Charles L. Johnson, Jr. and Thomas E. Kristofferson

[57] ABSTRACT

A satellite navigation receiver including two IF's and a phase locked loop. A signal generator produces synchronized signals of a constant frequency for the second mixer, phase detection and a doppler detection. The first mixer L.O. port and a doppler mixer receive a common input from a frequency multiplier and power divider. The multiplier input is supplied by the loop voltage controlled oscillator. Synchronized signals are economically obtained from one stable oscillator through the use of frequency multipliers, frequency dividers and another mixer.

7 Claims, 4 Drawing Figures

INVENTORS.
HOUSTON A. BROWN, Jr.
DONALD H. KEILEN
SABURO IFUNE
BY: [signature]
ATTORNEY INVENTORS
HOUSTON A BROWN. JR
DONALD H. KEILEN
SABURO IFUNE.
BY: [signature]
ATTORNEY

RADIANT ENERGY RECEIVERS

BACKGROUND OF THE INVENTION

This invention relates electromagnetic wave receivers, and more particularly, to a receiver for producing an output signal which changes with the input signal doppler.

The device of the present invention will have many applications and should, therefore, not be limited to those disclosed herein and in the drawings. However, the invention has been found to be especially useful when employed in connection with a satellite navigation system.

In the past, satellite navigation systems have been employed to obtain very accurate position fixes because of geophysical or other requirements. Unfortunately, such systems are unusually expensive. This is true because such systems are relatively large in size and complex. The large size and complexity is made necessary because of the accuracy required.

SUMMARY OF THE INVENTION

In accordance with the device of the present invention, the above-described and other disadvantages of the prior art are overcome by providing a radiant energy receiver with a first mixer, another doppler detector mixer, introducing the same signal to both mixers from a phase locked loop voltage controlld oscillator (VCO), and supplying the receiver with two or more synchronized signals of constant, but different, frequencies by the use of a signal generator.

The signal generator provides different frequency signals from a single stable oscillator which produces an output signal of a constant frequency. The signal generator thus performs complex functions, but is extraordinarily simple, small in size and inexpensive.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
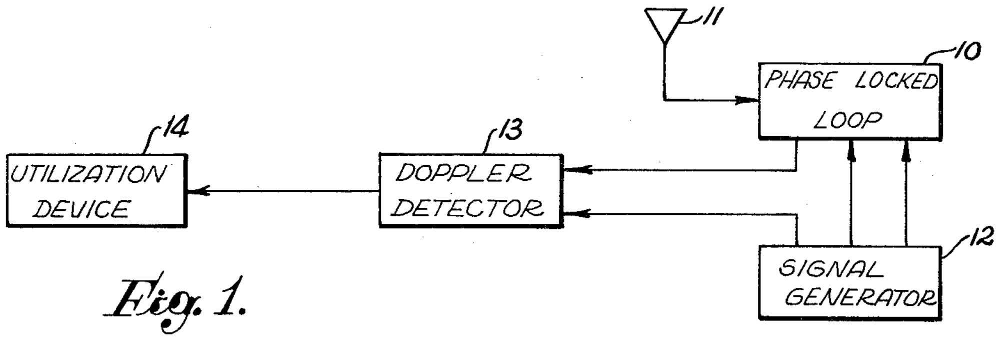
FIG. 1 is a block diagram of the system of the present invention.

In the drawing in FIG. 1, a phase locked loop 10 is connected from a receiving antenna 11. Loop 10 receives signals on two leads from a signal generator 12.

A doppler detector 13 is connected from both loop 10 and generator 12 to a utilization device 14.

Phase locked loop 10 may be entirely conventional. Alternatively, phase locked loop 10 may be that shown in FIG. 2.

Figure 2:
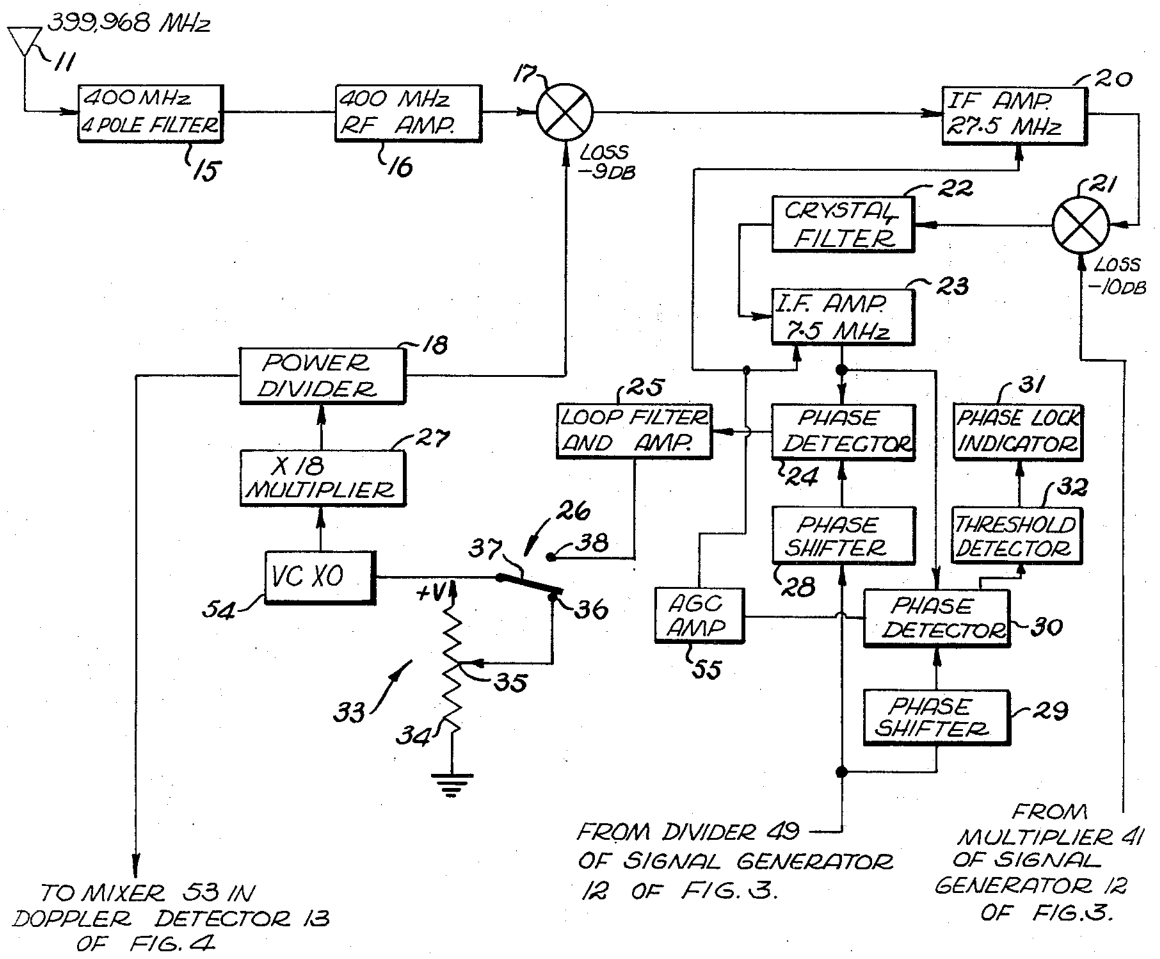
FIG. 2 is a block diagram of a phase locked loop shown in FIG. 1.

In FIG. 2, a filter 15 and a radio frequency (RF) amplifier 16 are connected in succession from antenna 11 to one input of a mixer 17.

A loop is actually created from the output of mixer 17 to its input from a power divider 18. The successive stages of this loop include a filter 19, an intermediate frequency (IF) amplifier 20, a mixer 21, a filter 22, an IF amplifier 23, a phase detector 24, a loop filter and amplifier 25, a single pole double throw switch 26, a voltage controlled oscillator VCXO 54, a x 18 frequency multiplier 27 and power divider 18.

The output of amplifier 23 is employed as one input to phase detector 24 and phase detector 30. The other input to phase detector 24 is supplied by a phase shifter 28. Phase shifter 28 receives an input from the signal generator 12. The same input is provided to a phase shifter 29. The output of phase shifter 29 is impressed upon a phase detector 30. The output of phase detector 30, amplified by A.G.C. amplifier 55 is employed to automatic gain control amplifier 20 and amplfier 23. The output of phase detector 30 also is impressed upon an indicator lamp 31 through a threshold detector 32.

A conventional phase locked loop, loop 10 may be described as a tracking "electronic servo" in that the phase of the incoming signal received through antenna 11 is tracked. However, before the phase of the incoming signal can be tracked, it first must be found or acquired. This may be done manually or automatically. A manual system is shown in FIG. 2. This includes a potentiometer 33 having a winding 34 and a wiper 35. One end of the winding 34 is grounded. The other end of the winding 34 is maintained at a constant potential plus *v*. Wiper 35 is connected to a contact 36 of switch 26. Switch 26 has a pole 37 and a second contact 38.

In FIG. 2, filter 15 may be a nominal 400 MHz, 4 pole filter having a loss of 1 db and a bandwidth of 20 MHz.

Amplifier 16 may be a nominal 400 MHz RF amplifier with a gain of 30 db and a noise figure of 3 db.

Amplifier 20 may be a 27.5 MHz IF amplifier with a maximum gain of 75 db, a bandwidth of approximately 3 MHz and a noise signal of 5 db. Filter 22 may be a crystal filter with a loss of 5 db, a bandwidth of approximately 1.5 KHz and a center frequency of 7.5 MHz.

Amplifier 23 may be a 7.5 MHz IF amplifier having a gain of 70 db, a bandwidth of approximately 1.5 MHz and a noise figure of 5 db.

Phase shifter 28 shifts the phase of its input signal −45°. Phase shifter 29 shifts the phase of its input signal +45°.

Loop filter and amplifier 25 may have a bandwidth of 20 Hz.

Navy satellites are now in orbit which transmit a radio frequency of 399.968 MHz. Thus, when the incoming signal picked up by antenna 11 is 399.968 MHz, there is no doppler. If such is the case, and phase locked loop 10 is tracking the incoming signal, the frequency of the VCXO 54 is 20.692 MHz.

Powder divider 18 simply divides the output signal of multiplier 27 between mixer 17 and doppler detector 13. Power divider 18 may be any conventional power divider such as a power divider of the balun type.

Figure 3:
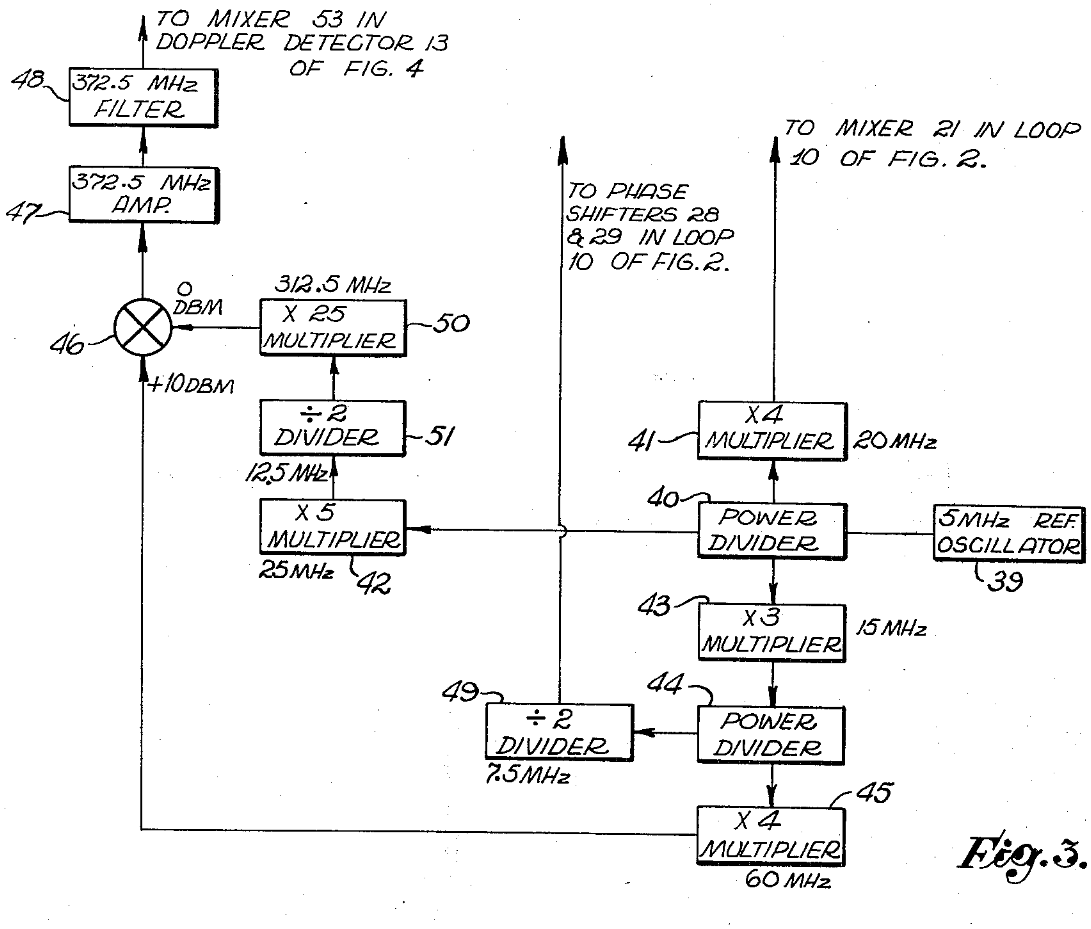
FIG. 3 is a block diagram of a signal generator shown in FIG. 1.

Signal generator 12 is shown in FIG. 3 including a 5 MHz reference oscillator 39. Oscillator 39 is a stable oscillator and has an output signal of a constant frequency.

A power divider 40 is connected from oscillator 39 and divides the output power three ways to a ×x 4 frequency multiplier 41, a ×x 5 frequency multiplier 42 and a ×x 3 frequency multiplier 43. As before, power divider 40 may be entirely conventional and may be of a balun type. A power divider 44, a ×x 4 multiplier 45, a mixer 46, an amplifier 47 and a filter 48 are connected in succession from multiplier 43. Power divider 44 may be identical to power divider 18. A ÷2 frequency divider 49 is connected from power divider 44. The output of multiplier 45 is connected to one input of mixer 46. A ×25 multiplier 50 has its output connected to the other input of mixer 43. A ÷2 frequency divider 51 is connected between multiplier 42 and multiplier 50.

Figure 4:
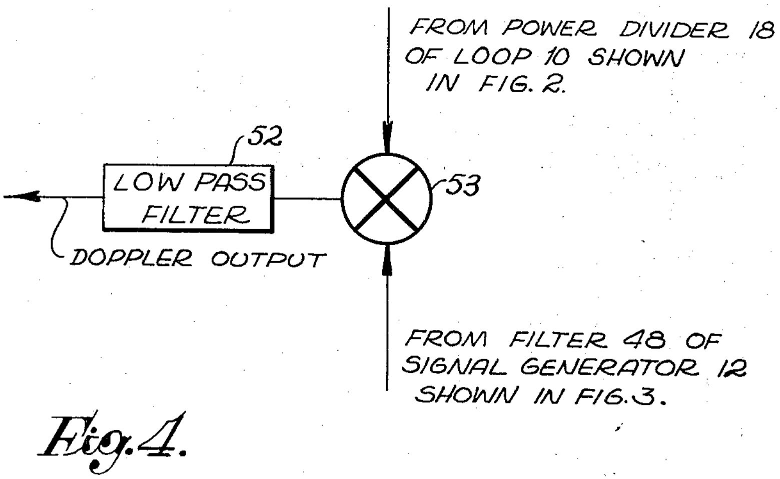
FIG. 4 is a block diagram of a doppler detector shown in FIG. 1.

As shown in FIG. 4, doppler detector 13 includes simply a low pass filter 52 connected from the output of a mixer 53. Utilization device 14 is connected from the output of filter 52. Mixer 53 receives one input from power divider 18 shown in FIG. 2, and a second input from filter 48 of signal generator 12 shown in FIG. 3.

In FIG. 3, the output of divider 49 is connected to the inputs to both of the phase shifters 28 and 29 shown in FIG. 2.

In FIG. 3, the output of multiplier 41 is connected to one intput to mixer 21 shown in FIG. 2.

In FIGS. 2, 3 and 4, each of the boxes shown may be entirely conventional although their arrangement is not. The same is true of the mixers.

As used herein, the word "doppler" is hereby defined to mean the frequency change or frequency shift of a signal produced by relative movements of transmitter and receiver. Sometimes this definition is used in the prior art. Sometimes it is not used in the prior art.

As used herein, the word "connected" is hereby defined to mean connected at some point. For example, filter 19 is connected to filter 15 via amplifier 16 and mixer 17.

As stated previously, the receiver of the present invention may have many uses other than in satellite navigation systems. However, when used in a satellite navigation system, it is common to extract a doppler and other transmitted data to calculate a position fix. According to the present invention, the output of filter 52, shown in FIG. 4, is an alternating signal of a frequency which is a function of the doppler. In a satellite navigation system, the other data appears as a demodulated signal on the output of phase detector 24 and may be extracted at that point, if desired.

The nominal frequency of the incoming signal is 400 MHz. The accurate frequency of this incoming signal to the doppler, however, is $f_a = 399.968$ MHz. VCXO may be described as having an output signal of a frequency $f_b$. The input signals to mixer 17 and mixer 53 from power divider 18 have the same frequency which may be described as a frequency $f_c$. As shown in FIG. 2, $f_c = 372.468$ MHz when there is no doppler.

In accordance with the foregoing, the input to mixer 21 from amplifier 20 has a frequency $f_d = f_a - f_c = 27.5$ MHz.

The input to mixer 21 supplied by multiplier 41 may be described as $f_e = 20$ MHz. The frequency of the input signal to phase detector 24 from amplifier 23 is then $f_f = f_d - f_e = 7.5$ MHz.

The input signal to phase shifters 28 and 29 from divider 49 is 7.5 MHz.

The frequency of the output signal of multiplier 45 is 60 MHz. The frequency of the output signal of multiplier 50 is 312.5 MHz. The frequency of the output signal of filter 48 is 372.5 MHz.

Note will be taken that the frequency of the output signal of filter 48, 372.5 MHz, is not the same as the frequency of the output signals of the power divider 18, i.e. 372.468 MHz. This difference is purposely obtained so that the output of filter 52 will be 32 KHz when there is zero doppler. This feature eliminates complications made necessary by a change in doppler algebraic sign. Typically, the output of filter 52 ranges from 24 KHz to 40 KHz. This represents a range of 32 KHz, ±8 KHz doppler. However, the receiver of the present invention is adapted to tune from the output of filter 52 from 22 KHz to 42 KHz.

Stated a different way, $f_a$ varies approximately within the range of 399,968 ±8 KHz.

From the foregoing, it will be appreciated that the input to mixer 46 from multiplier 50 has a frequency equal to $125 f_h / 2$, where $f_h$ is the frequency of the output signal of oscillator 39, i.e. $f_6 = 5$ MHz. Note will also be taken that the input to mixer 46 from multiplier 45 has a frequency of $12 f_h$.

OPERATION

In the operation of the embodiment of the invention shown in FIGS. 1, 2, 3 and 4, utilization device 14 may simply be a frequency meter calibrated in doppler frequency. Alternatively, device 14 may be a navigation computer connected from the output of filter 52 and/or connected from the output of phase detector 24. If utilization device 14 is simply a frequency meter, it may be calibrated in doppler frequency.

When an incoming signal is received through antenna 11, the position of wiper 35 on potentiometer 33 is manually adjusted while switch pole 37 is in the position shown in FIG. 2. The position of wiper 35 is adjusted until lamp 31 lights up. When lamp 31 lights up, this indicates that tracking is possible, and pole 37 may be moved out of engagement with contact 36 into engagement with contact 38. Loop 10 will then track the incoming signal. The input to mixer 17 from power divider 18 will then have a frequency directly proportional to the output of VCXO. Mixer 17 then mixes the output of amplifier 16 with one output of power divider 18. The output of mixer 17 is then beat to 27.5 MHz. At the output of mixer 21, the output of amplifier 20 is then beat down again to 7.5 MHz. This signal is phase detected by phase detector 24 with the phase shifted output of divider 49. The loop filter and amplifier 25 then changes the frequency of the output signal of the VCXO in a manner to reduce the output of phase detector 24 towards zero.

All the while, the inputs to phase shifters 28 and 29 are signals of the same frequency, i.e. 7.5 MHz. This frequency is constant because the frequency of the output signal of oscillator 39 is constant, and the output of divider 49 is derived from the output of oscillator 39. Similarly, the 20 MHz input to mixer 21 from multiplier 41 is also constant in frequency.

As stated previously, the 372.468 MHz input to mixer 53 with the 372.5 MHz input thereto from filter 48 causes an output from filter 52 to be 32 KHz when there is no doppler. The frequency of the output signal of filter 52 then varies from the frequency of 32 KHz as the doppler varies in magnitude and sign.

What is claimed is:

1. A radiant energy receiver comprising: a first mixer; first means to impress an incoming signal of a frequency $f_a$ on one input to said first mixer; a voltage controlled oscillator having a frequency $f_b$; second means connected from said voltage controlled oscillator to impress another signal on the other input of said first mixer of a frequency $f_c$ directly proportional to $f_b$; a second mixer; third means connected from the output of said first mixer to one input of said second mixer to filter the output of said first mixer and pass a signal to said second mixer of a frequency $f_d$, where $f_d = f_a - f_c$; a constant frequency oscillator having a frequency of oscillation $f_n$; fourth means connected from said constant frequency oscillator to the other input of said second mixer to impress a signal thereon of a frequency $f_e$; a phase detector; fifth means connected from the output of said second mixer to an input of said phase detector to filter the output of said second mixer and impress a signal on said phase detector of a frequency $f_c$, where $f_f = f_d - f_e$; a −45° phase shifter having its output connected to the other input of said phase detector; sixth means connected from said constant frequency oscillator to impress a signal on the input of said phase shifter of a frequency $f_f$; seventh means connected from the output of said phase detector to the input of said voltage controlled oscillator to cause it to change its oscillation frequency in a manner such that said frequency $f_d$ remains substantially constant if the frequency or phase $f_a$ changes; a third mixer, said second means being connected to one input of said third mixer to supply an input signal thereto of a frequency $f_c$ ; eighth means connected from said constant frequency oscillator to the other input of said third mixer to supply a signal thereto of a frequency $f_g$ ; a low pass filter connected from the output of said third mixer; and a utilization device connected from said low pass filter.

2. The invention as defined in claim 1, wherein $f_a$ varies approximately within the range of 399,968 ±8 KHz, said second means including a × 18 frequency multiplier, when $f_b$ = 20.692 MHz, $f_c$ = 372.468 MHz, said fourth means including a × 4 frequency multiplier, the input signal to said second mixer from said fourth means being 20 MHz, said frequency $f_g$ being equal to 372.5 MHz.

3. The invention as defined in claim 2, wherein said constant frequency oscillator includes a first power divider connected to said fourth means multiplier, a fourth mixer; a × 5 frequency multiplier, a ÷ 2 frequency divider and a ×25 frequency multiplier connected in succession from said first power divider to one input of said fourth mixer; a × 3 frequency multiplier, a second power divider, and a × 4 frequency multiplier connected in succession from said first power divider to the other input of said fourth mixer; an amplifier and a 372.5 MHz filter connected in succession from the output of said fourth mixer to said other input of said third mixer; and a ÷ 2 frequency divider connected from said second power divider to said phase shifter.

4. The invention as defined in claim 1, wherein $f_a$ varies approximately within the range of 399,968 ± 8 KHz, $f_c$ being equal to 372.468 MHz when $f_a$ is equal to 399.968 MHz, said fourth means including × 4 frequency multiplier, the input signal to said second mixer from said fourth means being 20 MHz, the said frequency $f_g$ being equal to 372.5 MHz.

5. The invention as defined in claim 4, wherein said fourth means includes a frequency multiplier, a fourth mixer, ninth means to impress a signal on one input of said fourth mixer of a frequency $125 f_n / 2$ , said ninth means being connected from said constant frequency oscillator to said one input of said fourth mixer, tenth means connected from said constant frequency oscillator to the other input of said fourth mixer to impress a signal thereon of a frequency $12f_n$, said eighth means being connected from the output of said fourth mixer to the said other input of said third mixer, one signal at the output of said fourth mixer having a frequency of 372.5 MHz.

6. The invention as defined in claim 5, wherein a × 3 frequency multiplier and a × 4 frequency multiplier are connected in succession from said constant frequency multiplier to the said other input of said fourth mixer, and a ÷ 2 frequency divider connected from the output of said ×3 multiplier to the input of said phase shifter.

7. A radiant energy receiver comprising: a phase locked loop including a first mixer, a voltage controlled oscillator and first means connected from said voltage controlled oscillator to supply said first mixer with one input signal of a frequency $f_c$ directly proportional to that of the voltage controlled oscillator output signal, said loop including a phase shifter, second means including a phase detector responsive to the output of said first mixer and connected from said phase shifter to vary the control voltage on said voltage controlled oscillator in a manner to reduce the phase shift of the output of said first mixer toward zero; a constant frequency oscillator; third means connected from said constant frequency oscillator to the input of said phase shifter to supply a signal thereto directly proportional to that of the output of said constant frequency oscillator; a second mixer having one input connected from said first means in a manner to receive a signal of said frequency $f_c$; and fourth means connected from said constant frequency oscillator to the other input of said second mixer to supply the same with a signal of a frequency directly proportional to that of the output signal of said constant frequency oscillator.

* * * * *